(12) United States Patent
Cantin, Jr.

(10) Patent No.: US 8,055,847 B2
(45) Date of Patent: Nov. 8, 2011

(54) EFFICIENT PROCESSING OF DATA REQUESTS WITH THE AID OF A REGION CACHE

(75) Inventor: Jason F. Cantin, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 12/168,209

(22) Filed: Jul. 7, 2008

(65) Prior Publication Data

US 2010/0005242 A1   Jan. 7, 2010

(51) Int. Cl.
*G06F 12/08* (2006.01)
(52) U.S. Cl. ........ 711/122; 711/119; 711/141; 711/151; 711/158
(58) Field of Classification Search .......... 711/122, 711/158, 119, 141, 151
See application file for complete search history.

(56) References Cited

U.S. PATENT DOCUMENTS

| | | | |
|---|---|---|---|
| 6,233,665 B1 | 5/2001 | Bolyn | |
| 2002/0042863 A1* | 4/2002 | Jeddeloh | 711/143 |
| 2003/0196060 A1 | 10/2003 | Miller | |
| 2006/0101209 A1 | 5/2006 | Lais | |
| 2006/0156048 A1* | 7/2006 | Hines et al. | 713/320 |
| 2007/0226386 A1 | 9/2007 | Sharp et al. | |

OTHER PUBLICATIONS

Cantin, J.F. et al., Coarse-Grain Coherence Tracking: RegionScout and Region Coherence Arrays, Micro, IEEE, Jan. 1, 2006, pp. 70-79, col. 26, No. 1, USA.
Gupta, A et al., Reducing Memory and Traffic Requirements for Scalable Directory-Based Cache Coherence Schemes, Proceedings of the International Conference on ParallelProcessing, Aug. 13, 1990, pp. I312-I321.

* cited by examiner

Primary Examiner — Jae Yu
(74) Attorney, Agent, or Firm — Dillon & Yudell LLP (57) ABSTRACT

A method and system for configuring a cache memory system in order to efficiently process processor requests. A group of cache elements, which include a Region Cache, a Region Coherence Array, and a lowest level cache, is configured based on a tradeoff of latency and power consumption requirements. A selected cache configuration differs from other feasible configurations in the order in which cache elements are accessed relative to each other. The Region Cache is employed in a number of configurations to reduce the power consumption, latency, and bandwidth requirements of the Region Coherence Array. The Region Cache is accessed by processor requests before (or in parallel with) the larger Region Coherence Array, providing the region coherence state and power efficiently to requests that hit in the Region Cache.

11 Claims, 10 Drawing Sheets

EFFICIENT PROCESSING OF DATA REQUESTS WITH THE AID OF A REGION CACHE

BACKGROUND

1. Technical Field

The present invention generally relates to data processing systems and in particular to clustered shared-memory multiprocessors. More particularly, the present invention relates to ordering cache accesses in clustered shared-memory multiprocessor systems.

2. Description of the Related Art

To reduce global bandwidth requirements within a computer system, many modern shared-memory multiprocessor systems are clustered. The processors are divided into groups called symmetric multiprocessing nodes (SMP nodes), such that processors within the same SMP node may share a physical cabinet, a circuit board, a multi-chip module, or a chip, thereby enabling low-latency, high-bandwidth communication between processors in the same SMP node. Two-level cache coherence protocols exploit this clustering configuration to conserve global bandwidth by first broadcasting memory requests for a line of data from a processor to the local SMP node, and only sending memory requests to other SMP nodes if necessary (e.g., if it is determined from the responses to the first broadcast that the requested line is not cached on the local SMP node). While this type of two-level cache coherence protocol reduces the computer system global bandwidth requirements, memory requests that must eventually be broadcast to other SMP nodes are delayed by the checking of the local SMP node first for the requested line, causing the computer system to consume more SMP node bandwidth and power. It is important for performance, scalability, and power consumption to first send memory requests to the appropriate portion of the shared-memory computer system where the cached data is most likely to be found.

Coarse-Grain Coherence Tracking with the aid of Region Coherence Arrays is a technique that can improve the performance, scalability, and power consumption of broadcast-based, shared-memory multiprocessor systems. Region Coherence Arrays track coherence status at a coarse granularity, and use this information to route memory requests in order to minimize request latency, conserve interconnect bandwidth and reduce power consumption.

There are three implementation considerations with Coarse-Grain Coherence Tracking facilitated by Region Coherence Arrays: area, latency, and power consumption. First, Region Coherence Arrays need to be somewhat large to be effective, such that the Region Coherence Arrays map several times the data contained in the processor's cache hierarchy. Empirical results show that Region Coherence Arrays with 4 KB regions need at least one-fourth the number of locations of the processor's cache hierarchy to be effective (assuming a 128-byte cache line). Thus, Region Coherence Arrays consume a significant area in facilitating Coarse-Grain Coherence Tracking. Second, and in part due to their size, Region Coherence Arrays may need to be accessed in parallel with the lowest-level cache to minimize the latency added to external requests. The region coherence state is used when a cache miss is detected to route the external request. Third, Region Coherence Arrays can be power-hungry. The non-trivial size of Region Coherence Arrays and a need to be accessed in parallel with the lowest-level cache can lead to considerable power consumption. Thus, power is wasted accessing the Region Coherence Array on lowest-level cache hits.

SUMMARY OF ILLUSTRATIVE EMBODIMENTS

Disclosed are a method and system for configuring a cache memory system in order to efficiently process processor requests. A group of cache elements, which include a Region Cache, a Region Coherence Array, and a lowest level cache, is configured for processor access based on a tradeoff of latency and power consumption requirements. A selected cache configuration differs from other possible configurations in the order in which cache elements are accessed relative to each other. The Region Cache is employed in a number of configurations to reduce the power consumption, latency, and bandwidth requirements of the Region Coherence Array. The Region Cache is accessed by processor requests before (or concurrently with) the larger Region Coherence Array, providing the region coherence state efficiently to requests that hit in the Region Cache, while reducing power consumption.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method and system for configuring a cache memory system in order to efficiently process processor requests. A group of cache elements, which include a Region Cache, a Region Coherence Array, and a lowest level cache, is configured for processor access based on a tradeoff of latency and power consumption requirements. A selected cache configuration differs from other possible configurations in the order in which cache elements are accessed relative to each other. The Region Cache is employed in a number of configurations to reduce the power consumption, latency, and bandwidth requirements of the Region Coherence Array. The Region Cache is accessed by processor requests before (or concurrently with) the larger Region Coherence Array, providing the region coherence state efficiently to requests that hit in the Region Cache, while reducing power consumption.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
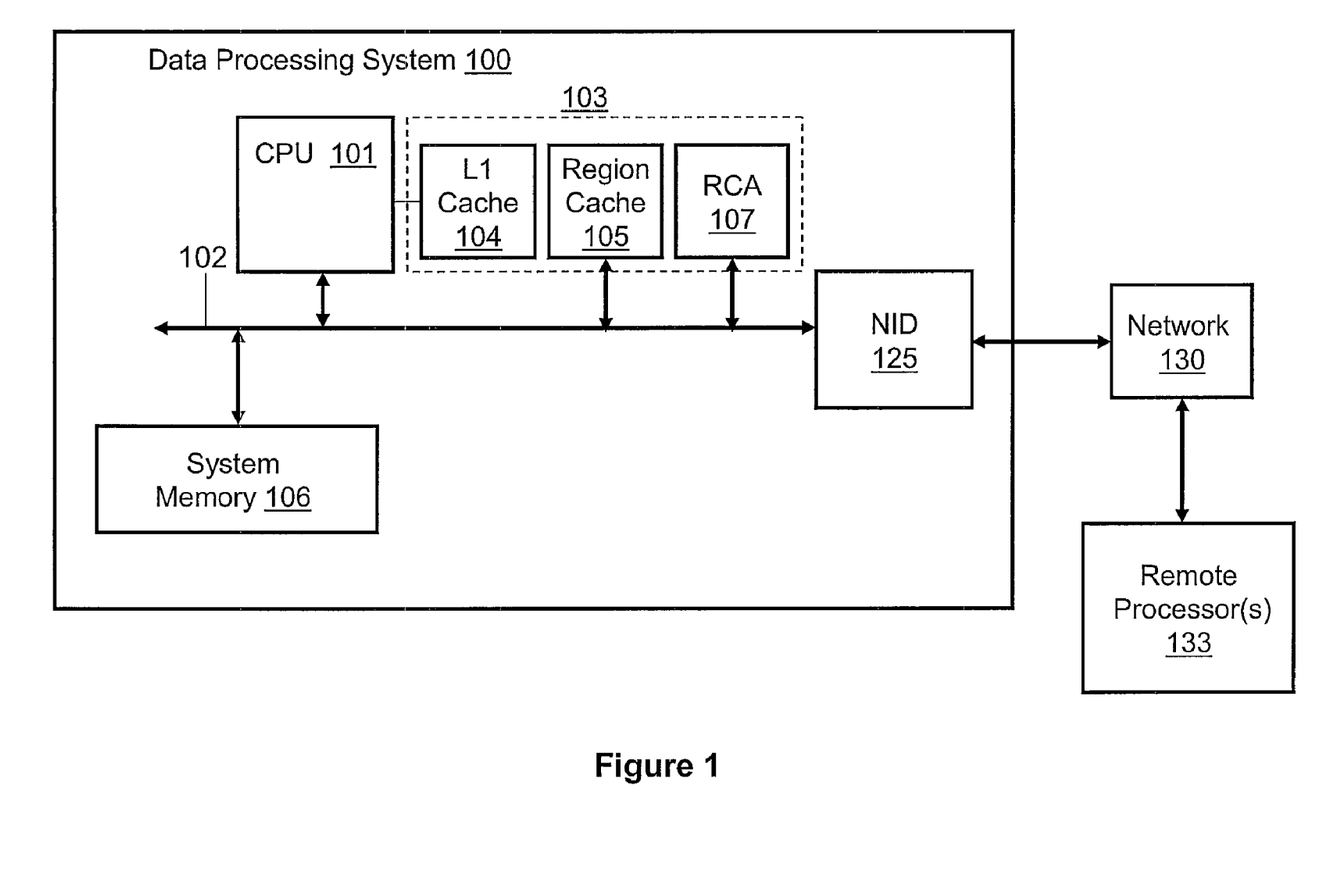
FIG. 1 is a block diagram representation of a data processing system, according to one embodiment of the invention.

With reference now to FIG. 1, there is depicted a block diagram representation of a data processing system (and connected network). DPS 100 comprises at least one processor or central processing unit (CPU) 101 connected to system memory 106 via system interconnect/bus 102. DPS 100 also comprises cache sub-system/hierarchy 103, which is connected to system bus 102. In other implementations, cache sub-system 103 may be directly connected between one or more processors (CPU 101) and memory 106, in one of several possible configurations. Additionally, multiple levels of cache may be provided, including an on-chip processor cache (e.g., a level 1 (L1) cache) and a lowest level cache 104 and one or more other caches or cache structures (e.g., region cache 105 and region coherence array 107).

DPS 100 is also illustrated with a network interface device (NID) 125, with which DPS 100 connects to one or more processors 133 via access network 130. Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention.

The described embodiments provide several functional features that are implemented utilizing the components of DPS 100. Specifically, the CPU 101 and cache subsystem 103 includes logic (e.g., cache controller logic) to provide various functional features, including: (a) logic for configuring a cache memory system to efficiently handle processor requests based on latency and power consumption requirements; and (b) logic for implementing the configured cache memory system. According to the illustrative embodiment, the functional features as well as additional features/functionality are described below within the description of FIGS. 2-10.

Figure 2:
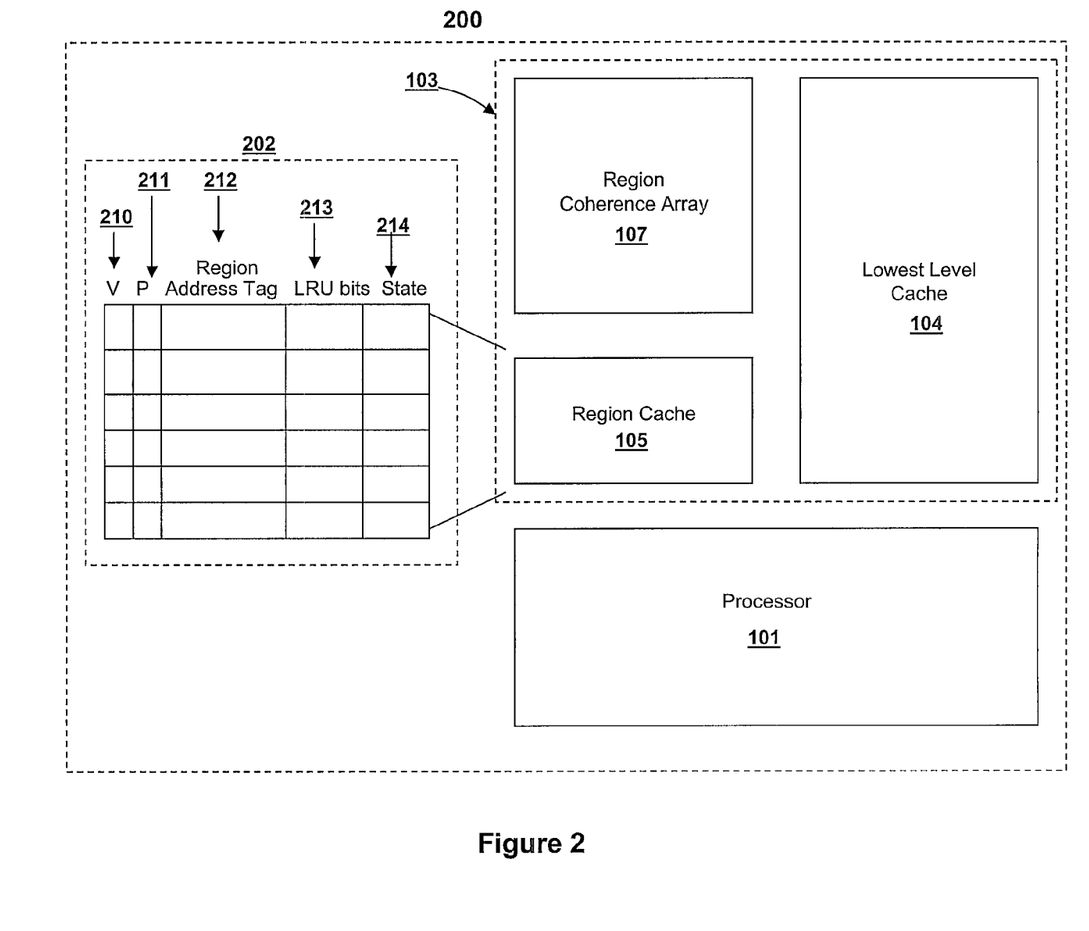
FIG. 2 illustrates a region cache and likely placement of the region cache in a system relative to the region coherence array and the lowest-level cache, according to an embodiment of the invention.

With reference now to FIG. 2, a region cache and likely placement of the region cache relative to the region coherence array and the lowest-level cache in a system is illustrated, according to an embodiment of the invention. Cache elements 200 comprise processor 101 and cache sub-system 103. Cache sub-system 103 further comprises region cache 105, region coherence array 107, and lowest level cache 104. Also illustrated in cache elements 200 is Region ID 202.

Region Cache 105 is a small, tagged, set-associative array for storing state information for regions (illustrated and identified by Region ID 202) recently used by processor 101. Region Cache 105 is essentially a small cache for Region Coherence Array 107. Processor requests check Region Cache 105 for the requested region before (or concurrently with) accessing the larger Region Coherence Array 107. Each entry contains (1) region address tag 212, (2) a Region Coherence state 214, (3) bits to implement a least-recently-used (LRU) replacement policy 213, (4) valid bit 210, and (5) one or more parity bits 211. Entries in Region Cache 105 are allocated by processor requests, with state information obtained from Region Coherence Array 107. The information in Region Cache 105 is merely a subset of the information in Region Coherence Array 107, and regions may be evicted from Region Cache 105 without updating Region Coherence Array 107. Should information in a Region Coherence Array entry change, the corresponding Region Cache entry (if one exists) may be updated or invalidated. By virtue of being small, Region Cache 105 is faster and requires less power to access than region coherence array 107. Region Coherence Array 107 provides the necessary capacity to back up Region Cache 105, and handles external requests.

Region Cache 105 is accessed by processor requests before (or concurrently with) the larger Region Coherence Array, allowing the region coherence state to quickly and power-efficiently requests that hit in Region Cache 105. Processor requests only need to obtain the region coherence state associated with the region to route the external request. Therefore, region cache 105 does not need line-counts or presence bits as does Region Coherence Array 107, which must also handle requests from other processors in the system. Region Cache 105 may be thought of as a filter, reducing the power consumption, latency, and bandwidth requirements of the Region Coherence Array.

Region Cache 105 may be used in one of five configurations to trade-off power consumption and/against latency. These five configurations are illustrated by FIGS. 3-7, described below. The configurations differ in the manner/order in which Region Cache 105 and region coherence array 107 are accessed relative to each other and the lowest level cache by processor requests. The configurations are ordered with regard to power and latency. From the first configuration to the fifth, power consumption increases and latency decreases.

In two of the configurations (cache configuration-1 300, FIG. 3, and cache configuration-3 500, FIG. 5), region coherence array 107 may optionally be shared by the processors on a single chip to save area, and region cache 105 filters requests to the shared region coherence array 107.

Figure 3:
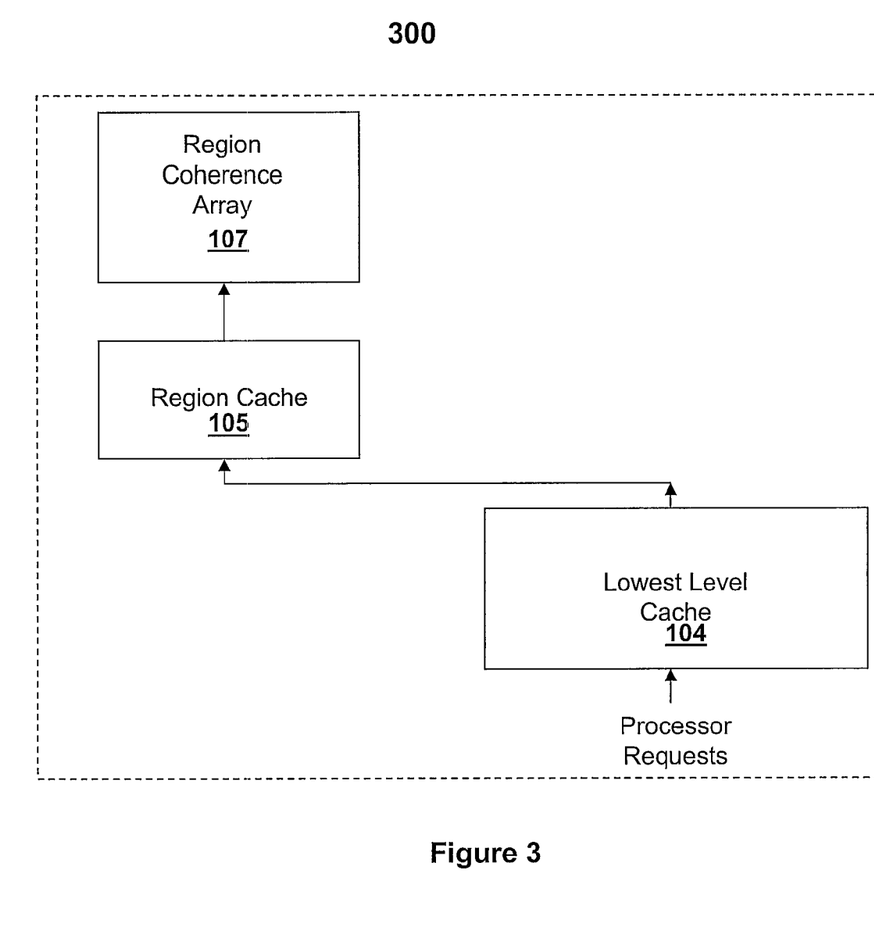
FIG. 3 is a first cache configuration illustrating a placement of a region cache relative to a processor and other cache elements, according to one embodiment.

FIG. 3 is a first cache configuration illustrating a placement of a region cache relative to a processor and other cache elements, according to one embodiment. Cache configuration-1 300 comprises lowest level cache 104 which initially receives requests from processor 101 (not directly shown). Connected to lowest level cache 104 is region cache 105. In addition, Region Cache 105 is further connected to Region Coherence Array 107.

Figure 8:
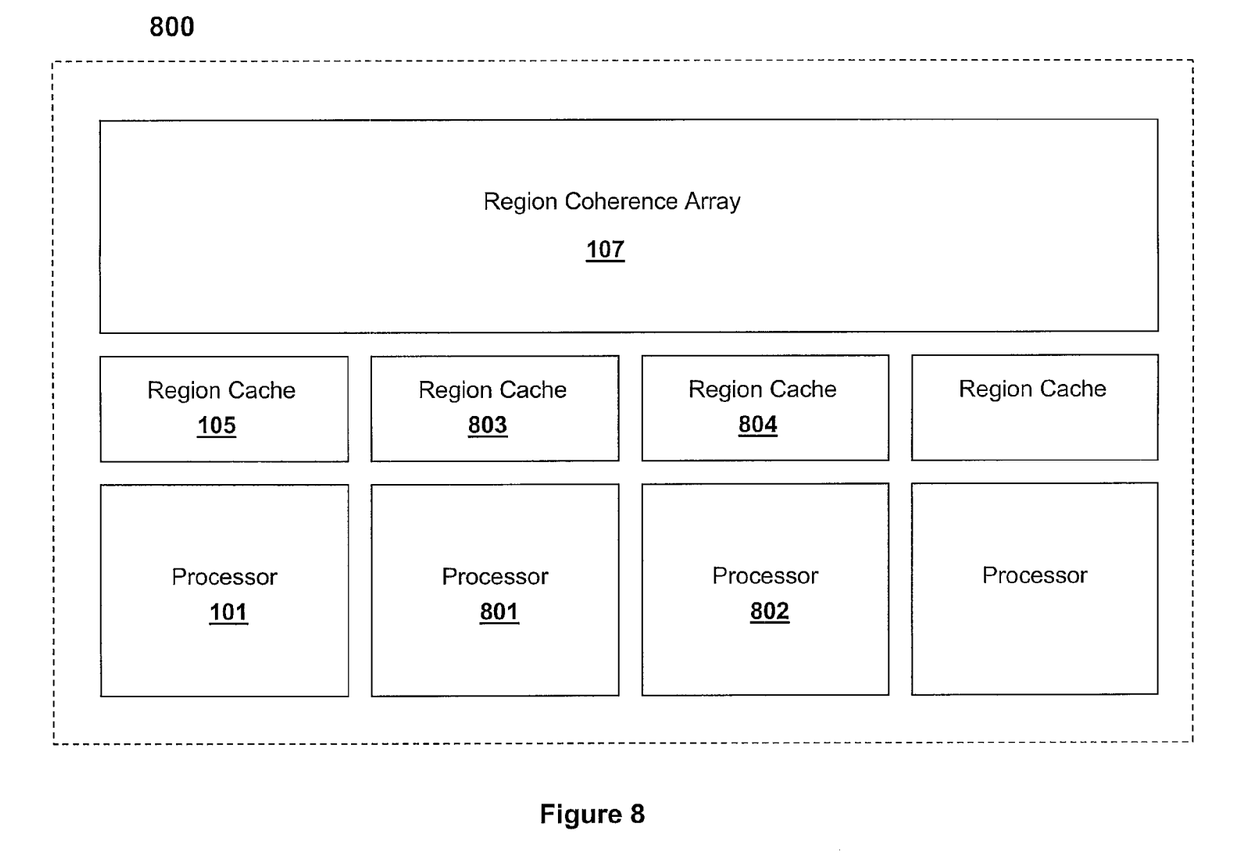
FIG. 8 is a cache sharing configuration, according to one embodiment.

In cache configuration-1 300, Region Cache 105 and Region Coherence Array 107 are accessed in series with each other after a cache miss is detected: Cache configuration-1 300 minimizes the affect of the two structures (Region Cache 105 and Region Coherence Array 107) on system power consumption at the cost of latency added to external requests. However, on cache hits within Region Cache 105, less latency is added to external requests than the latency resulting from cache hits within Region Coherence Array 107. In cache configuration-1 300, Region Coherence Array 107 may optionally be shared among the processor cores on a chip to save area, as illustrated in FIG. 8. Region Cache 105 then mitigates the added latency penalty of the shared Region Coherence Array 107, and reduces the bandwidth demand on the shared Region Coherence Array 107.

Figure 4:
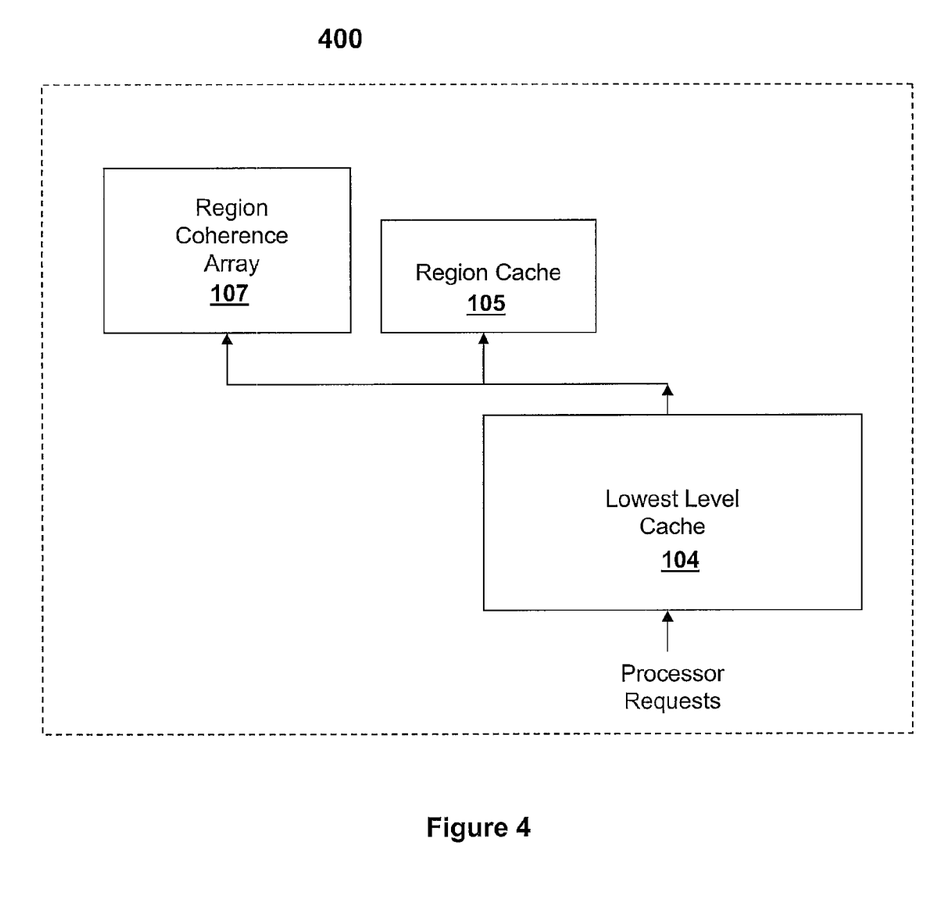
FIG. 4 is a second cache configuration illustrating a placement of a region cache relative to a processor and other cache elements, according to one embodiment.

FIG. 4 is a second cache configuration illustrating a placement of a region cache relative to a processor and other cache elements, according to one embodiment. Cache configuration-2 400 comprises lowest level cache 104 which initially receives requests from processor 101 (not directly shown). Connected to lowest level cache 104 is a pair of branches comprising region cache 105 and region coherence array 107, respectively. The pair of branches enables a parallel access to region cache 105 and region coherence array 107.

In cache configuration-2 400, region cache 105 and region coherence array 107 are accessed in parallel with (or concurrently with or at substantially the same time with) each other, after a cache miss in lowest level cache 104 is detected. Cache configuration-2 400 is similar to cache configuration-1 300, because the structures are only accessed after a cache miss is detected to save power, but has lower average latency and lower worst-case latency at the cost of a little more power.

Figure 5:
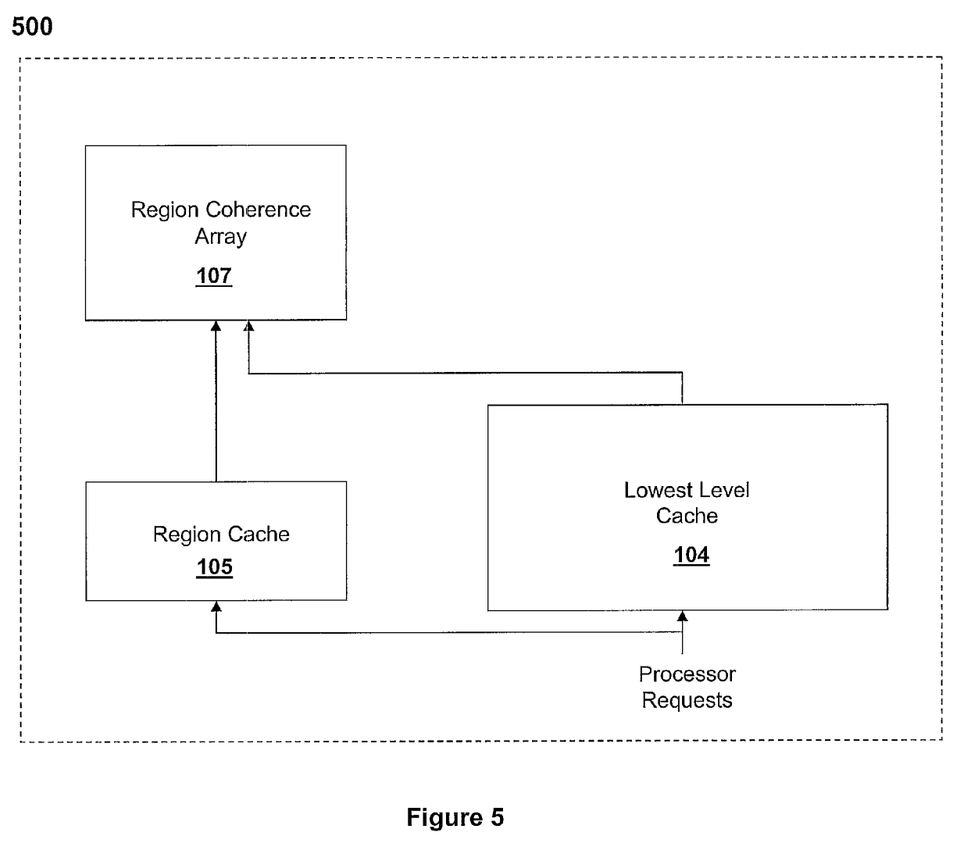
FIG. 5 is a third cache configuration illustrating a placement of a region cache relative to a processor and other cache elements, according to one embodiment.

FIG. 5 is a third cache configuration illustrating a placement of a region cache relative to a processor and other cache elements, according to one embodiment. Cache configuration-3 500 comprises a pair of branches comprising lowest level cache 104 and region cache 105. The pair of branches enables a parallel access to lowest level cache 104 and region cache 105. Each element of the pair of branches is then connected to region coherence array 107.

In cache configuration-3 500, region cache 105 is accessed in parallel with the lowest-level cache, but the larger region coherence array 107 is only accessed after a cache miss has been detected and a Region Cache miss has also occurred. On Region Cache hits, the region coherence state is available before the cache miss is detected. Cache configuration-3 500 uses more power than the second configuration (cache configuration-2 400), but adds less latency to external requests than the second configuration. In addition, like the first configuration, region coherence array 107 may optionally be shared among the processor cores on a chip to save area (FIG. 8). Region cache 105 then mitigates the added latency penalty of the shared region coherence array 107, and reduces the bandwidth demand of all processor cores.

Figure 6:
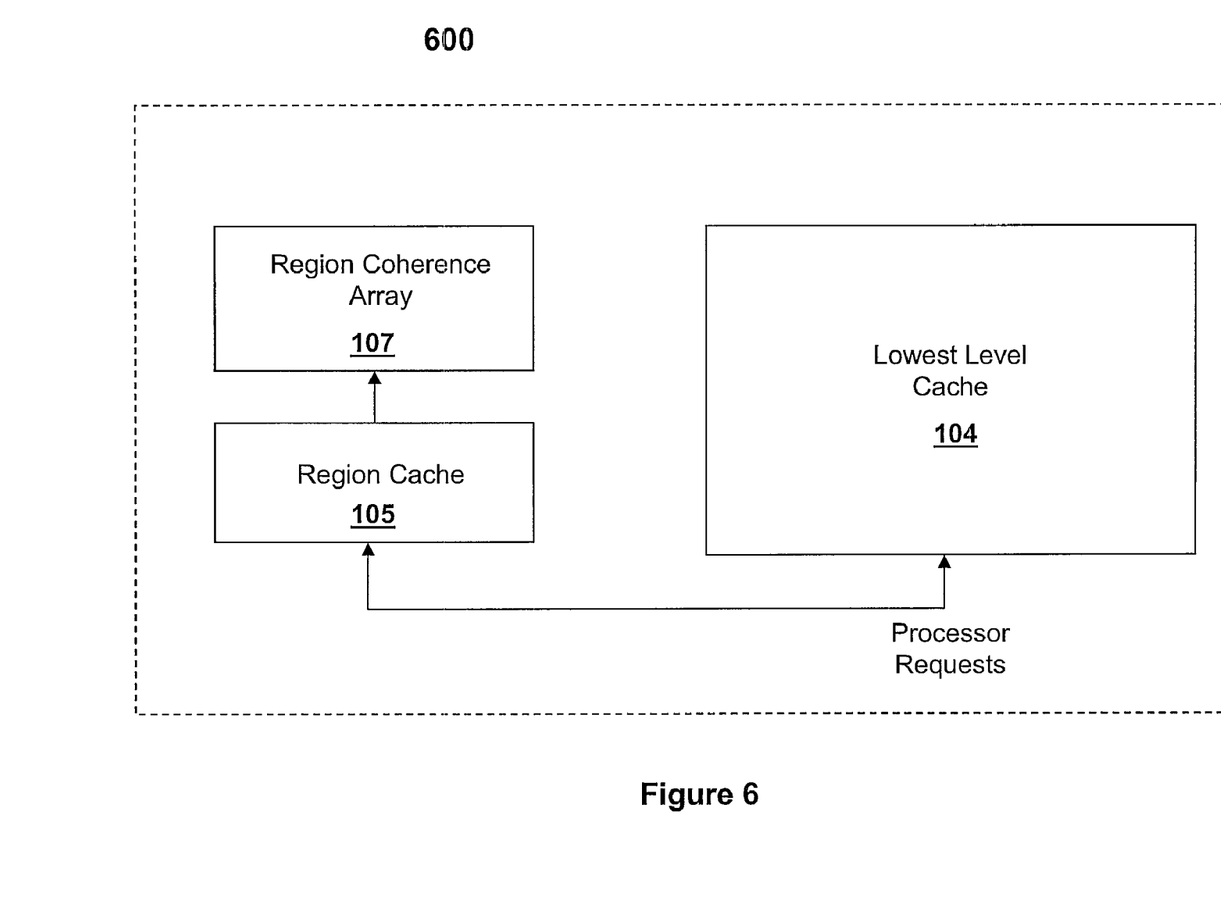
FIG. 6 is a fourth cache configuration illustrating a placement of a region cache relative to a processor and other cache elements, according to one embodiment.

FIG. 6 is a fourth cache configuration illustrating a placement of a region cache relative to a processor and other cache elements, according to one embodiment. Cache configuration-4 600 comprises lowest level cache 104. In addition, processor 101 is connected to region cache 105. Region cache 105 is further connected to region coherence array 107.

In cache configuration-4 600, region cache 105 is accessed in series with region coherence array 107. However, Region Cache 105 and Region Coherence Array 107 are accessed in parallel with lowest level cache 104. Cache configuration-4 600 uses more power than the third configuration, because both structures (Region Cache 105 and Region Coherence Array 107) are accessed in parallel with lowest level cache 104 (wasting power on cache hits). However, cache configuration-4 600 saves power (over a system with Region Coherence Array 107 alone) for requests that hit in Region Cache 105, with a small increase in power for requests that miss in Region Cache 105.

Figure 7:
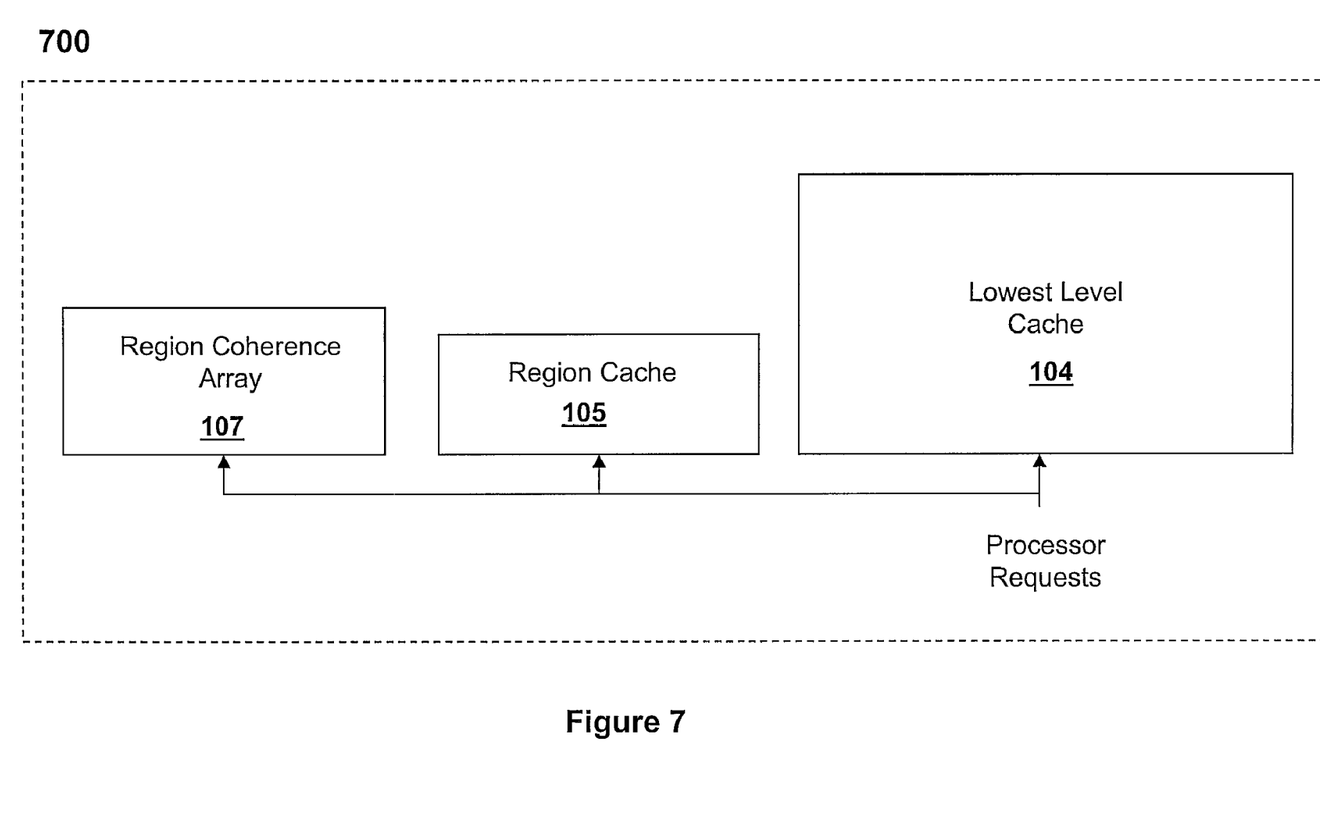
FIG. 7 is a fifth cache configuration illustrating a placement of a region cache relative to a processor and other cache elements, according to one embodiment.

FIG. 7 is a fifth cache configuration illustrating a placement of a Region Cache relative to a processor and other cache elements, according to one embodiment. Cache configuration-5 700 comprises lowest level cache 104, Region Cache 105 and Region Coherence Array 107.

In cache configuration-5 700, Region Cache 105 is accessed in parallel with Region Coherence Array 107 and lowest level cache 104. In cache configuration-5 700, Region Cache 105 can provide the Region Coherence state information faster than Region Coherence Array 107 on a hit, relaxing the requirement that Region Coherence Array 107 have access latency less than or equal to that of lowest level cache 104. Cache configuration-5 700 minimizes latency by accessing all the structures at once, but requires more power than the other configurations.

The main advantage of having Region Cache 105 is that most processor requests hit in Region Cache 105, and are satisfied with either less latency or less power consumption than Region Coherence Array 107. Empirical data suggests more than half of processor requests hit with as little as 128 entries. Other advantages include filtering processor requests, which makes it feasible to have one shared Region Coherence Array (107) per chip to save area.

FIG. 8 is a cache sharing configuration, according to one embodiment. Cache configuration-6 800 comprises a plurality of processors including first processor 101, second processor 801 and third processor 802. Cache configuration-6 800 also comprises a number of region caches including first Region Cache 105, second Region Cache 803 and third Region Cache 804. Included in cache configuration-6 800 is Region Coherence Array 107 which is shared among all processors in cache configuration-6 800.

In cache configuration-1 300 and cache configuration-3 500, Region Coherence Array 107 may be (optionally) shared among the processor cores on a chip, as illustrated in Cache configuration-6 800. By sharing one large Region Coherence Array, less storage is used due to common code and data at the cost of higher latency accessing distant parts of Region Coherence Array 107. With shared Region Coherence Array 107, the Region Cache (e.g., 105) is able to mitigate the latency penalty, reduce on-chip communication to access Region Coherence Array 107, and mitigate the increased bandwidth demand of multiple processor cores on one Region Coherence Array 107.

Figure 9:
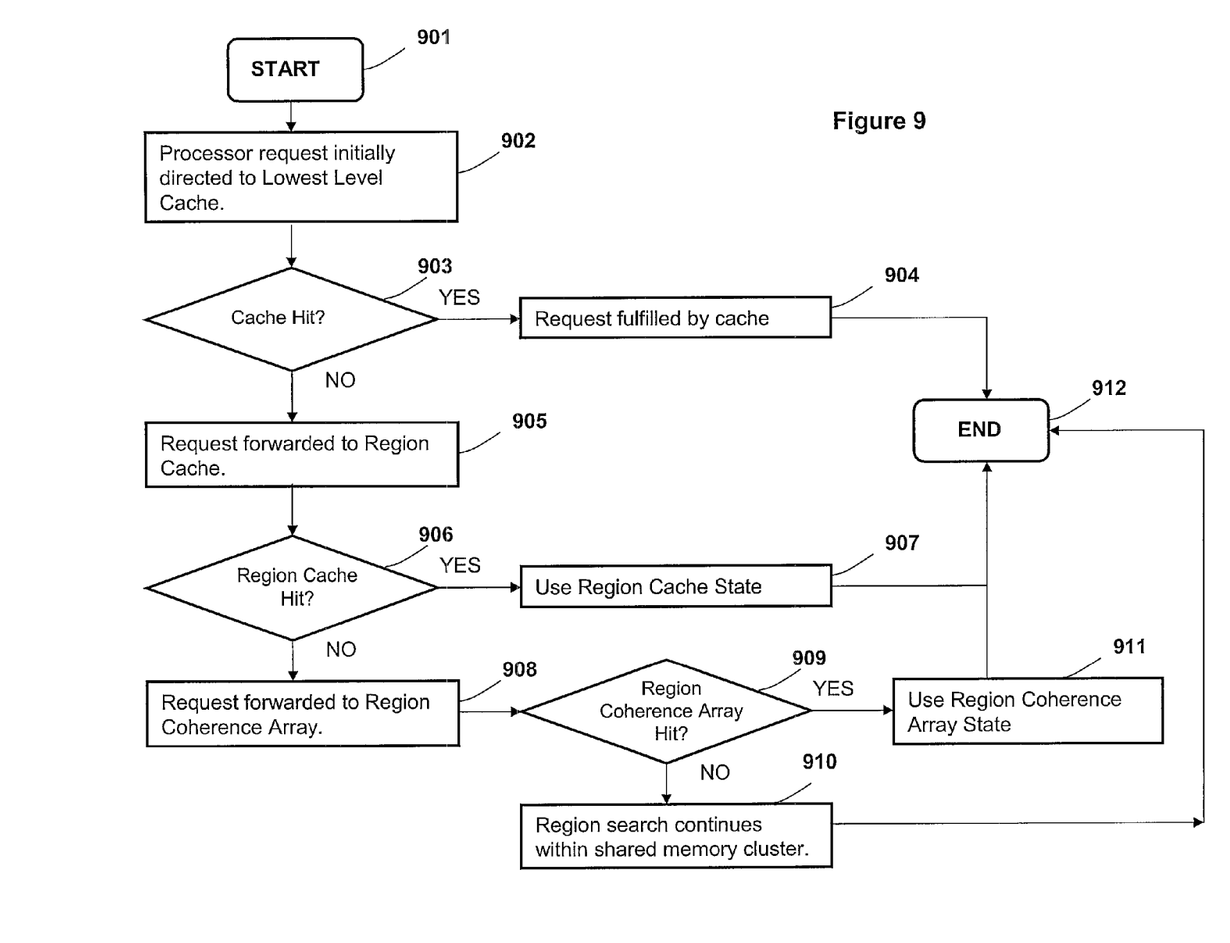
FIG. 9 is a flow chart illustrating the processing of requests in the first cache configuration, according to one embodiment.

FIG. 9 is a flow chart illustrating the processing of requests in the first cache configuration, according to one embodiment. The process of FIG. 9 begins at initiator block 901 and proceeds to block 902, at which a processor request is initially directed to the lowest level cache. At decision block 903, a data processing system determines whether a cache hit occurs in the lowest level cache. If at block 903, the data processing system determines that a cache hit occurs in the lowest level cache, the process proceeds to block 904, at which, the processor request is fulfilled by the lowest level cache If at block 903, the data processing system determines that a cache miss occurs in the lowest level cache, the process proceeds to block 904, at which, the request is forwarded to the region cache.

At decision block 903, a data processing system determines whether a cache hit occurs in the lowest level cache. If at block 903, the data processing system determines that determines that a cache hit occurs in the lowest level cache, the process proceeds to block 904, at which, the processor request is fulfilled by the lowest level cache. If at block 903, the data processing system determines that a cache miss occurs in the lowest level cache, the process proceeds to block 904, at which, the request is forwarded to the region cache.

At decision block 906, the data processing system determines whether a cache hit occurs in the region cache. If at block 906, the data processing system determines that determines that a cache hit occurs in the region cache, the process proceeds to block 907, at which, the region cache state is utilized to fulfill the request. If at block 906, the data processing system determines that a cache miss occurs in the region cache, the process proceeds to block 908, at which the request is forwarded to the region coherence array.

At decision block 909, the data processing system determines whether a cache hit occurs in the region coherence array. If at block 909, the data processing system determines that a cache hit occurs in the region coherence array, the process proceeds to block 911, at which, the region coherence array state is utilized to fulfill the request. If at block 909, the data processing system determines that a cache miss occurs in the region coherence array, the process proceeds to block 910, at which the search for the data region continues (in the likelihood that the data region is shared) within a shared memory cluster associated with the data processing system. The process ends at block 912.

Figure 10:
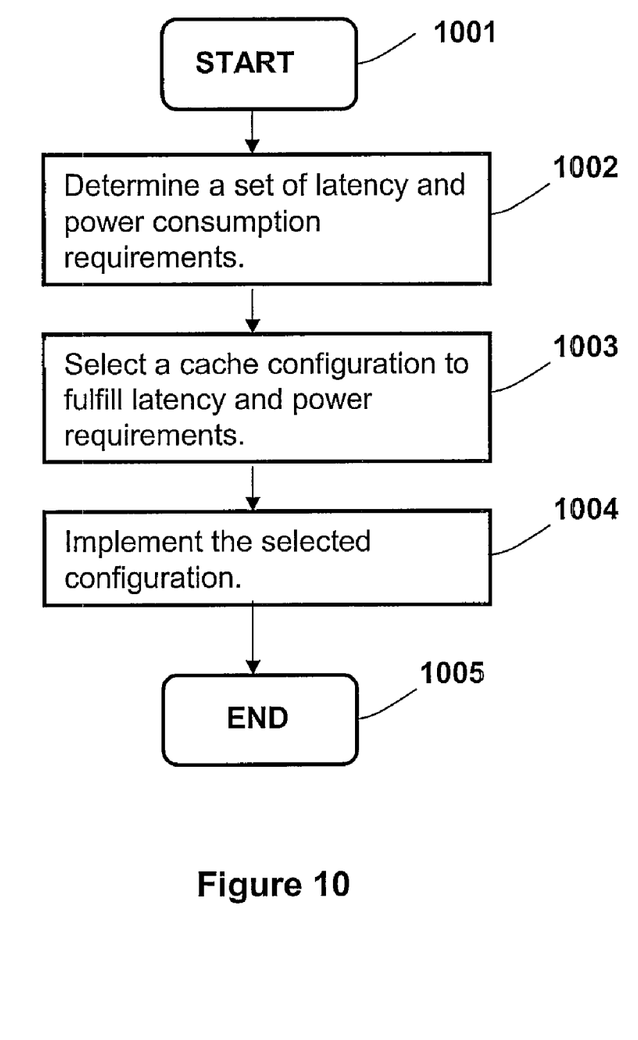
FIG. 10 is a flow chart illustrating a method for determining and implementing a cache configuration, according to one embodiment.

FIG. 10 is a flow chart illustrating a method for determining and implementing a cache configuration, according to one embodiment. Although the methods illustrated in FIG. 10 may be described with reference to components shown in FIGS. 1-9, it should be understood that this is merely for convenience and alternative components and/or configurations thereof can be employed when implementing the various methods.

The process of FIG. 10 begins at initiator block 1001 and proceeds to block 1002, at which a designer of a data processing system determines/identifies a set of latency and power consumption requirements desired for the system. At block 1003, a cache configuration is selected to fulfill latency and power requirements. The cache configuration interconnects a set of cache elements, which include a lowest level cache, a region cache and a region coherence array in a selected one of multiple designs/configurations. The selected configuration is implemented in the data processing system, as shown at block 1004. The process ends at block 1005.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As expanded upon within the appended claims, the illustrative embodiments provide a data processing system comprising: a processor; a cache group having multiple cache elements, including at least one lower level cache, a region cache, and a region coherence array, interconnected to each other and to the processor in one of multiple access configurations that is pre-selected based on request latency and power consumption considerations for resolving a data request within the cache group; and logic that, in response to the data request, initiates an access to one or more of the multiple cache elements within the cache group in an order corresponding to the pre-selected access order.

Also, features of the illustrative embodiment further covers a method for designing a cache memory system comprising: determining optimal request latency and power consumption requirements desired for resolving data request within a cache group having multiple cache elements including a lower level memory, a region cache, and a region cache array; selecting, based on a consideration of the request latency and power consumption requirements, a first configuration from among multiple possible configurations in which the cache elements of the cache group may be interconnected for enabling an access order to resolve a data request, that fulfills the request latency and power consumption requirements; and designing the cache memory system with the first cache configuration. Also, the method covers manufacturing a processing device having a processor and the cache memory system that includes the cache group with cache elements arranged in the first cache configuration.

In one embodiment, the designing process comprises one of: configuring the cache elements to enable a series access order from the lower level cache to the region cache, then to the region cache array, when the data request first misses at the lower level cache, and then misses at the region cache, respectively, wherein said series access order enables the one cache element to be accessed prior to the other cache element; configuring the cache elements to enable a concurrent access with the lower level cache and the region cache, prior to an access to the region cache array when the data request misses at the lower level cache and at the region cache; or configuring the cache elements to enable a concurrent access with the lower level cache, the region cache, and the region cache array, wherein said multiple cache elements are accessed at substantially the same time.

In yet another embodiment, the method comprises: providing logic for selectively accessing the cache elements in a particular order based on a pre-selected design configuration of the cache elements, where the logic includes logic for performing one of: concurrently accessing the region cache and the region coherence array, following a cache miss in the lowest level cache, when the region cache and region coherence array are interconnected with the lower level cache via a first configuration; concurrently accessing the region cache and the lowest level cache, prior to an access of the region coherence array, interconnected via a second configuration, wherein an access to the region coherence array occurs after a cache miss in one or more of the region cache and the lowest level cache; concurrently accessing the region coherence array, the region cache and the lowest level cache, interconnected via a third configuration; performing a series access from the lowest level cache, to the region cache and then to the region coherence array, when the region cache and region coherency array are interconnected via a fourth configuration, and wherein an access of the region cache occurs only after a cache miss in the lowest level cache, and a subsequent access of the region coherence array occurs only after a cache miss in the region cache; concurrently accessing the region cache and the lowest level cache, prior to accessing the region coherence array, interconnected via a fifth configuration, wherein access to the region coherence cache occurs after a cache miss in the region cache; and wherein each of the configurations provide a different balance of power consumption and request latency for resolving a data request.

An alternate embodiment provides in a data processing system having a processor which implements a cache access order among cache elements of a cache group coupled to said processor, a method comprising: selecting a first configuration having a first access order of the cache elements, wherein the selected first configuration minimizes an amount of request latency associated with a data request, when minimizing a request latency for resolving a data request within the cache group is a priority consideration relative to minimizing power consumption within the cache group, wherein the cache elements include a lowest level cache, a region cache, and a region coherence array; selecting a second configuration having a second access order of cache elements, which second access order reduces a level of power consumption associated with handling a data request within the cache elements, when reducing the power consumption of the cache group while resolving a data request within the cache group is a priority consideration relative to minimizing power consumption within the cache group; and selecting one of multiple other configurations each having a different access order of cache elements to enable a design-based tradeoff between minimizing the request latency and reducing the power consumption.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A data processing system comprising:
   a processor;
   a cache group having multiple cache elements, including:
      at least one lower level cache;
      a region coherence array;
      a region cache for storing state information obtained from the region coherence array in one or more entries, wherein the one or more entries correspond to regions recently used by the processor; and
      wherein the at least one lower level cache, the region cache, and the region coherence array are interconnected to each other and to the processor in accordance with one of multiple access configurations, wherein an access configuration of the multiple access configurations is pre-selected based on request latency and power consumption considerations for resolving a data request within the cache group, and wherein the multiple access configurations are ordered by increasing power consumption and reduced latency; and
   logic executing on the processor that, in response to the data request, initiates an access to one or more of the multiple cache elements within the cache group in an order corresponding to a pre-selected access permission of the one or more of the multiple cache elements.

2. The data processing system of claim 1, wherein the multiple access configurations include a first configuration providing a first access order to the cache elements, which order minimizes a degree of request latency associated with resolving the data request.

3. The data processing system of claim 1, wherein the multiple access configurations include a second configuration providing a second access order to the cache elements, which order reduces a level of power consumption associated with resolving the data request.

4. The data processing system of claim 1, wherein the multiple access configurations include a third configuration having a third access order to the cache elements, which effects a balancing between minimizing the request latency and minimizing the power consumption.

5. The data processing system of claim 1, further comprising:
   logic for autonomously selecting an access configuration from among the multiple access configurations for accessing the cache group based on a relative weight provided to the request latency considerations versus the power consumption considerations for resolving data requests within the cache group.

6. The data processing system of claim 5, wherein the logic for selecting an access configuration further comprises one or more of:

logic for configuring the cache elements to enable a series access order from the lower level cache to the region cache, then to the region coherence array, when the data request first misses at the lower level cache, and then misses at the region cache, respectively, wherein said series access order enables the one cache element to be accessed prior to the other cache element;

logic for configuring the cache elements to enable a concurrent access with the lower level cache and the region cache, prior to an access to the region coherence array when the data request misses at the lower level cache and at the region cache; and logic for configuring the cache elements to enable a concurrent access with the lower level cache, the region cache, and the region coherence array, wherein said multiple cache elements are accessed at the same time.

7. The data processing system of claim 1, further comprising logic for selectively accessing the cache elements in a particular order based on a pre-selected design configuration of the cache elements from among the multiple access configurations, said logic including logic for performing one of:

concurrently accessing the region cache and the region coherence array, following a cache miss in the lowest level cache, when the region cache and region coherence array are interconnected with the lower level cache via a first configuration;

concurrently accessing the region cache and the lowest level cache, prior to an access of the region coherence array, interconnected via a second configuration, wherein an access to the region coherence array occurs after a cache miss in one or more of the region cache and the lowest level cache;

concurrently accessing the region coherence array, the region cache and the lowest level cache, interconnected via a third configuration;

performing a series access from the lowest level cache, to the region cache and then to the region coherence array, when the region cache and region coherence array are interconnected via a fourth configuration, and wherein an access of the region cache occurs only after a cache miss in the lowest level cache, and a subsequent access of the region coherence array occurs only after a cache miss in the region cache;

concurrently accessing the region cache and the lowest level cache, prior to accessing the region coherence array, interconnected via a fifth configuration, wherein access to the region coherence cache occurs after a cache miss in the region cache; and wherein each of the configurations provide a different balance of power consumption and request latency for resolving a data request.

8. A method for designing a cache memory system comprising:

determining optimal request latency and power consumption requirements desired for resolving data request within a cache group, the cache having multiple cache elements including: a lower level cache memory; a region coherence array; a region cache for storing state information obtained from region coherence array in one or more entries, wherein the one or more entries correspond to regions recently used by the processor; and, and a region cache coherence array;

wherein the lower level cache, the region cache, and the region coherence array are interconnected in accordance with one of multiple access configurations;

selecting, based on a consideration of the request latency and power consumption requirements, a first configuration from among the multiple access configurations to resolve a data request by fulfilling request latency and power consumption requirements of the data request, and wherein the multiple access configurations are ordered by increasing power consumption and reduced latency; and designing the cache memory system with the first cache configuration.

9. The method of claim 8, further comprising manufacturing a processing device having a processor and the cache group with cache elements arranged in the first configuration.

10. The method of claim 8, wherein said designing further comprises one of:

configuring the cache elements to enable a series access order from the lower level cache to the region cache, then to the region coherence array, when the data request first misses at the lower level cache, and then misses at the region cache, respectively, wherein said series access order enables the one cache element to be accessed prior to the other cache element;

configuring the cache elements to enable a concurrent access with the lower level cache and the region cache, prior to an access to the region coherence array when the data request misses at the lower level cache and at the region cache; or configuring the cache elements to enable a concurrent access with the lower level cache, the region cache, and the region coherence array, wherein said multiple cache elements are accessed at the same time.

11. The method of claim 8, further comprising:

providing logic for selectively accessing the cache elements in a particular order based on a pre-selected design configuration of the cache elements from among the multiple access configurations, said logic including logic for performing one of:

concurrently accessing the region cache and the region coherence array, following a cache miss in the lowest level cache, when the region cache and region coherence array are interconnected with the lower level cache via a first configuration;

concurrently accessing the region cache and the lowest level cache, prior to an access of the region coherence array, interconnected via a second configuration, wherein an access to the region coherence array occurs after a cache miss in one or more of the region cache and the lowest level cache;

concurrently accessing the region coherence array, the region cache and the lowest level cache, interconnected via a third configuration;

performing a series access from the lowest level cache, to the region cache and then to the region coherence array, when the region cache and region coherence array are interconnected via a fourth configuration, and wherein an access of the region cache occurs only after a cache miss in the lowest level cache, and a subsequent access of the region coherence array occurs only after a cache miss in the region cache; or concurrently accessing the region cache and the lowest level cache, prior to accessing the region coherence array, interconnected via a fifth configuration, wherein access to the region coherence cache occurs after a cache miss in the region cache; and wherein each of the configurations provide a different balance of power consumption and request latency for resolving a data request.

* * * * *